CORNELIA O. LINE.
Supplementary Ovens for Cooking-Stoves.

No. 142,483.  Patented September 2, 1873.

Witnesses:

Inventor:

Cornelia O. Line,

By Johnson, Klaucke & Co,
her Attorneys.

UNITED STATES PATENT OFFICE.

CORNELIA O. LINE, OF INDIANAPOLIS, INDIANA.

IMPROVEMENT IN SUPPLEMENTARY OVENS FOR COOKING-STOVES.

Specification forming part of Letters Patent No. 142,483, dated September 2, 1873; application filed July 1, 1873.

*To all whom it may concern:*

Be it known that I, CORNELIA O. LINE, of Indianapolis, in the county of Marion and State of Indiana, have invented a new and useful Improvement in Ovens for Cooking-Stoves, of which the following is a specification:

My invention relates to supplemental detachable ovens for stoves for cooking or warming food either by steam or hot air; and my said invention consists in conducting the steam from a kettle into either the attached oven or the fixed oven of the stove by means of a shifting pipe from the kettle, in combination with branch pipes of the attached oven communicating with the latter and the stove-oven, whereby the steam from the same generator may be employed for cooking and warming purposes in the supplemental oven, and diverted therefrom for keeping the food moist and regulating the cooking in the stove-oven, while at the same time keeping the attached oven hot by circulating around it in passing to the stove-oven, as will be described hereafter; also, in the combination of a valve in the stove-oven door with the attached oven, the surrounding heating-chamber whereof communicates with the stove-oven and the stove-pipe, whereby the draft round the attached oven is controlled for heating purposes when it is desired to cook in the attached oven by the combined action of the steam and the increased heating-draft from the stove-oven.

Figure 1:
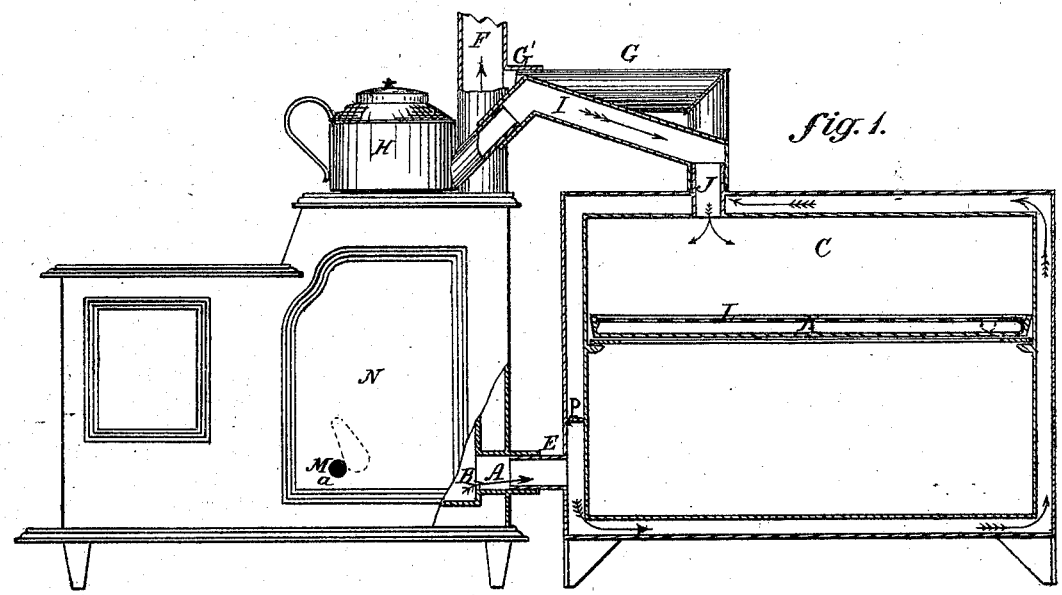
Figure 2:
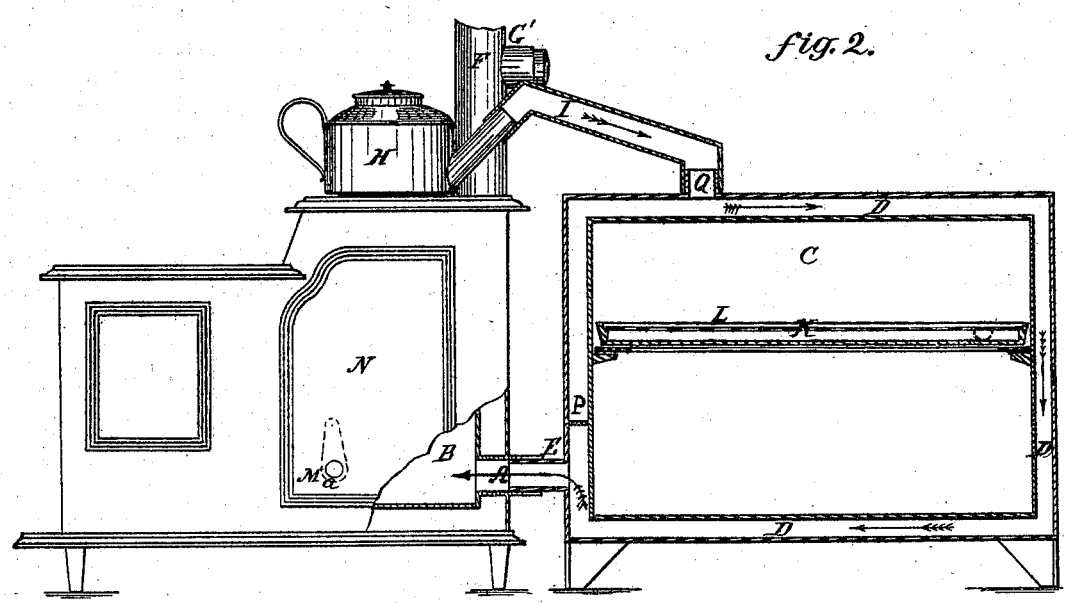

In the accompanying drawings, Figure 1 represents a stove with the supplemental oven in section and attached thereto, showing the latter in separate connection with the stove-oven and the steam-kettle; and Fig. 2, a similar view, showing the heating-space of the supplemental oven as a conduit for the steam into the stove-oven.

The stove may be of any suitable construction, requiring only an external flue-opening, A, from its oven B, by which to connect the latter with a supplemental attached oven, C, of portable box form, having a surrounding chamber, D, connecting with the stove-oven B by a branch pipe, E, near the bottom, and with the stove-pipe F at the top by a pipe, G, making a direct communication round the attached oven C with the stove-oven B and smoke-flue. This attachment of the two ovens is shown as at the rear of the stove, but it may be made at the side.

The design of the supplemental oven C is to keep cooked food warm and moist, and to cook by steam therein when desired, or by the combined action of the steam and heat from the kettle and the stove-oven, while at the same time utilizing the connection of the attached oven C with the stove-oven B to form a steam-conduit, D, to the latter to aid in the proper cooking of the food. For this purpose I connect a kettle, H, on the stove with the attached oven C by a pipe, I, which joins the spout of the kettle with a short pipe, J, passing through the top of the oven C, so as to let the steam therein directly upon the articles to be cooked or kept warm and prevented from drying, the cooking-pan K being arranged near the top of the oven C, and provided with a strainer, L, on which to place the article to be cooked.

By this arrangement the cooking may be done in the attached oven both by steam and hot air by opening a valve, M, in the stove-oven door N, so as to cause the hot draft from the oven B to pass round the heating-flues D of the attached oven C and heat the latter, while the steam enters it from the kettle. The valve M opens and closes an opening, $a$, in the oven-door N, and when it is opened a draft is made thereby through the oven B round the attached oven-flue D, to the stove-pipe F, the heating-flue D having a partition, P, to direct the heat from the stove-oven B beneath and round the attached oven. When, however, it is desired to direct the steam from the kettle H into the stove-oven, the pipe G, for the escape of the hot air, is removed, a cap, G', put over the opening in the stove-pipe F, and the pipe I from the steam-kettle H changed from its connection with the oven C to the branch pipe Q, communicating with the chamber D round said oven C and the stove-oven, so that the steam passes from the kettle into the stove-oven B through the medium of the attached oven, as shown in Fig. 2. Either oven, therefore, can be used with steam from the same kettle by simply changing the connection for the steam from the oven C to the flue D, which surrounds said oven, so that, instead of taking hot air from the stove-oven, steam is carried into it by the same flue through which the hot air passes out when the connections are made for using both hot air and steam with the attached oven.

The attached oven is provided with one or more doors, and the pipes which connect it with the stove are made in any suitable manner for connection.

The attached oven may be also used for drying fruits and for warming buildings.

Having described my invention, I claim—

1. The stove-oven B and the attached oven C, in combination with the steam-generator H, its pipe I, and the pipes J and Q, interchangeable with the kettle-pipe I, to put steam into either oven through the medium of the attached oven, as described.

2. The combination of the valve M in the oven-door N with the attached oven C, having a surrounding flue, D, and the smoke-flue F of the stove, as and for the purpose set forth.

CORNELIA O. LINE.

Witnesses:
JOHN G. SMITH,
M. O. McCLAIN.